Sept. 30, 1958     R. A. WISE     2,854,623
ELECTRONIC TUBE TESTING MEANS
Filed Nov. 17, 1954
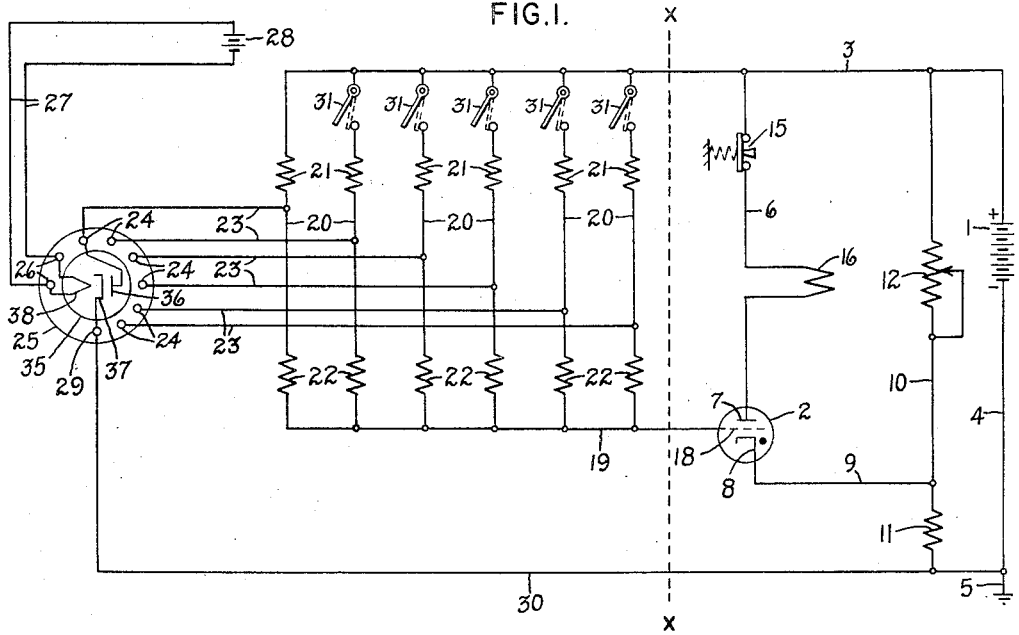
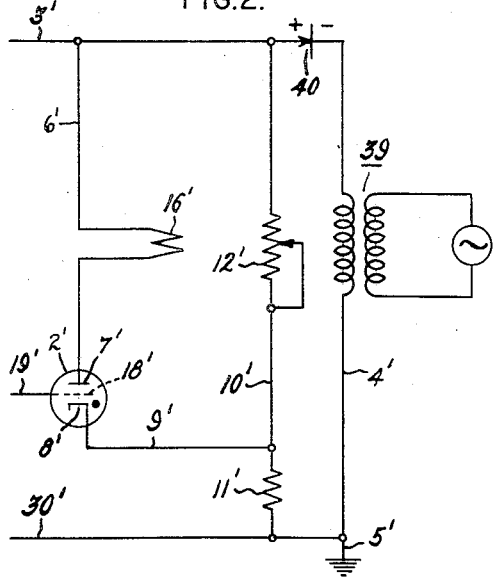
INVENTOR:
ROBERT A. WISE,
BY *Nathan Lowenfeld*
HIS ATTORNEY.

United States Patent Office 2,854,623
Patented Sept. 30, 1958

2,854,623
ELECTRONIC TUBE TESTING MEANS

Robert A. Wise, Asheboro, N. C., assignor to General Electric Company, a corporation of New York Application November 17, 1954, Serial No. 469,450

2 Claims. (Cl. 324—24)

My invention relates to test equipment and pertains more particularly to new and improved means for testing electronic tubes.

In the manufacture of electronic tubes it is sometimes the case that completed tubes are imperfect owing to conditions therein which would result in open tube circuits during operation. The conditions which render the tubes imperfect are generally due to unsatisfactory electrical connections between the tube electrodes or elements and the base pins. Such unsatisfactory connections may result from imperfect welds, element breakage, etc. and may occur either as complete disconnections between the elements and pins which result in completely opened circuits or may occur as disconnections which occur only intermittently during operation and under conditions of vibration of the tube and result in intermittent opening of the tube circuits. It is, of course, desirable to detect and reject such imperfect tubes. Accordingly, the primary object of my invention is to provide new and improved testing means adapted for detecting tubes including defects which would result in open tube circuits under conditions of operation.

Another object of my invention is to provide a new and improved electronic tube open circuit detecting means adapted for detecting tubes including defective conditions which result in intermittent open circuits during operation and under conditions of vibration of the tubes.

Another object of my invention is to provide a new and improved electronic tube open circuit detecting means of variable high sensitivity.

Still another object of my invention is to provide a new and improved electronic tube open circuit detecting means which is adjustable for testing tubes of different characteristics and having various numbers of electronic circuits, and is simple in construction, and highly reliable in operation.

Further objects and advantages of my invention will become apparent as the following description proceeds and the features of novelty which characterize my invention will be pointed out with particularity in the claims annexed to and forming part of this specification.

In carrying out the objects of my invention I provide a direct current resistance bridge and a gas-discharge tube including a control electrode. The tube under test is used as one arm of the bridge. Means is provided for simulating operation of the tube under test; and the tube under test is so connected in the bridge that all of its elements are in parallel. The resultant voltage drop across the conducting tube is adapted for controlling the gas-discharge tube by means of the control electrode. If the circuits through the elements of the tube under test are all complete, the control electrode will be ineffective for igniting the gas-discharge tube. If, however, one or more of the circuits of the tube under test are open, the control electrode will be effective for igniting the gas-discharge tube and thereby complete a circuit for energizing operating means, such as defective tube indicating or ejecting means.

For a better understanding of my invention reference may be had to the accompanying drawing in which:

Fig. 1 is schematic illustration of a preferred embodiment of my invention; and

Fig. 2 is a fragmentary schematic illustration of a modified form of my invention.

Referring to the drawing, I have shown in Fig. 1 a direct current power source, shown as a battery for simplicity of illustration and generally designated 1. Additionally, I have shown detecting means which may be a grid-controlled gas-discharge tube, such as the thyratron designated 2. Connected to the positive side of the power source 1, which for example may be in the order of 150 volts, is a lead line 3 and connected to the negative side is another line 4 leading to ground 5. By means of a line 6, the plate 7 of the thyratron 2 is connected to the positive side of the power source 1. The cathode 8 of the thyratron is connected by a line 9 to another line 10 which is connected across the power source 1. Provided in the line 10 is a resistor 11 adapted for providing a predetermined desired voltage drop between the cathode 8 of the thyratron and ground. Also provided in the line 10 is a variable resistance device or rheostat 12, used to control the voltage drop across resistor 11 and also adapted for providing a sensitivity control for the detector tube 2, in a manner and for a purpose to be described in detail hereinafter.

Connected in series in the line 6 is a reset switch or button 15 which is normally biased to a closed or conducting position. Also connected in series in the line 6 is operating means which may be in the form of a relay of which only the coil 16 is shown. The relay (not shown) operated in response to energization of the coil 16 may be utilized for indicating or ejecting a defective tube under test. It will be understood, however, that any equivalent operating means may be alternatively employed for accomplishing the same purpose as the relay and coil 16.

In the arrangement described to this point the thyratron 2 is adapted, when ignited or fired, for completing a circuit from the power source 1 through the relay coil 16 thereby to energize the coil. The reset switch 15 is adapted when depressed for breaking this circuit thereby to extinguish the thyratron for deenergizing the relay coil 16.

Provided for controlling the ignition or operation of the thyratron and thereby controlling the energization of the just-described relay coil is a circuit including a control grid 18 in the thyratron 2. The grid 18 is adapted for firing the thyratron only when a predetermined critical voltage higher than the ground voltage is applied thereto. The grid 18 is connected to a line 19. Connected in parallel relationship between the line 19 and the above-referred-to line 3, which is connected to the positive side of the power source 1, is a plurality of lines 20. Provided in each of the lines 20 is a first resistor 21, and a second resistor 22 which is of a predetermined considerably higher value than the first resistor. For example, the resistor 21 may be in the order of one-half megohm while the resistors 22 may be in the order of ten megohms.

Connected to each line 20 intermediate the respective resistors 21 and 22 is a line 23 which is electrically connected to one of a plurality of tube prong receptacles 24 in a tube test socket schematically shown and designated 25. The test socket 25 may be constructed so as to be adaptable for various internal connections as well as various electrode structures in the tubes to be tested. The receptacles 24 in the socket 25 are arranged and adapted for receiving the prongs or leads electrically connected to the plate and grid elements of a tube inserted in the socket for test purposes. The socket 25 also includes a pair of receptacles 26 adapted for receiving the prongs connected to the filament or heating element of the tube under test. Connected to the receptacles 26 by a pair of lines 27 is a second power source 28 which is illustrated as a battery but may be any source suitable for energizing the tube filament. Still another receptacle 29 is provided in the socket 25 and is adapted for receiving the tube prong leading to the tube cathode. The receptacle 29 is suitably connected by a line 30 to ground 5.

Connected in series with the resistors 21 and 22 in all the lines 20 except the one associated with the test socket receptacle 24 adapted for receiving one plate prong of the tube under test is a switch 31. The switches 31 are provided for selectively adapting the equipment to the testing of tubes having various numbers of electrodes or elements. That is, by leaving all the switches 31 open, in the manner shown in the drawing, the circuit is adapted for testing diodes. By moving one or more of the switches to the closed positions thereof indicated by dash lines, the circuit may be selectively adapted for testing triodes, tetrodes, etc. Any number of lines 20 having the resistors 21 and 22 and a switch 31 and adapted for being connected by lines 23 to associated receptacles of the test socket 25 may be provided.

The above-described tube testing arrangement is normally such that approximately 150 volts is applied to the thyratron plate 7. Thus, when no tube is inserted in the test socket 25 a positive voltage of 150 volts is applied to the grid 18 of the thyratron whereby the thyratron fires thereby to result in energization of the relay coil 16. This will be the case even if all of the switches 31 are in the open positions as shown in the drawings, since the circuit from the power source 1 to the thyratron grid 18 will be completed through the line 20 which does not include a switch and is connected to the plate lead receptacle of the tube socket 25.

Thus, just before a tube is placed in the socket 25 for testing, the relay coil 16 will be energized as though to indicate the presence of a defective tube in the socket. In a manner to be described in detail hereinafter, subsequent insertion of a perfect or non-defective tube in the socket 25 will result in a voltage on the grid 18 insufficient for firing or igniting the thyratron 2. The thyratron, however, will continue ignited and the coil will remain energized until the reset button 15 is pressed and the thyratron operating circuit is broken momentarily during the tube testing operation now to be described in detail.

For purposes of simplification of illustration and description of the testing operation, I have symbolically shown a diode designated 35 in the test socket 25. Inasmuch as the tube shown is a diode, all of the switches 31 may be left in the open positions thereof shown in solid lines in the drawing. When a diode such as 35 is inserted in the socket 25, the plate or anode 36 thereof is electrically connected by its respective base pin and one of the lines 23 to the line 20 in which no switch 31 is provided. The cathode 30 is similarly connected to the receptacle 29 which, by means of the line 30, is connected to ground 5; and the ends of the filament or heater 38 are suitably connected through the receptacles 26 and lines 27 to the supplementary power source 28. Thus, if the electrical connections between the plate 36, the cathode 37, and the heater 38 and their respective base pins are continuous and none of these elements themselves are defective, the tube 35 will heat up and conduct current through the tube, thereby to simulate actual tube operation. That is, due to the voltage applied to the plate through lines 3 and 23 and resistor 21 electrons will be caused to flow from the cathode to the plate and tube operation will be simulated. If the tube operates satisfactorily and conducts current in the described manner, the voltage between the plate and cathode of the tube 35 under test will fall to a low value due to tube current flowing through the associated resistor 21. This reduced voltage is applied to the grid 18 through the line 20, the resistor 22 and the line 19 and is insufficient for firing the thyratron 2. However, at this stage of the test operation the thyratron 2 is already ignited, owing to the relatively high voltage placed on the grid 18 before the tube 35 was placed in the test socket and thus the relay coil 16 is in a state of energization. Therefore, the reset button 15 must be depressed thereby to break the thyratron plate circuit for extinguishing the thyratron and deenergizing the relay coil. Thereafter, the reset button must be released to complete an electrical connection between the thyratron plate 7 and the line 3 thereby to resume the positive charge on the plate 7. At this time, however, the voltage on the grid 18 is insufficient for firing the thyratron, owing to the presence of a satisfactorily operating tube in the socket 25, and the relay coil remains deenergized thereby indicating that the tube under test is good. If the tube is imperfect or operating unsatisfactorily, as by absence of electrical connections between the various tube elements and their respective pins, the tube 35 will fail to conduct current and the voltage on the plate of the tube being tested will not be greatly reduced by a drop through the resistor 21; and, thus, the voltage placed on the grid 18 will continue to be sufficient for firing the thyratron 2 thereby to energize the relay coil 16 for indicating that the tube under test is imperfect or operating unsatisfactorily.

It will be seen that my arrangement is particularly adaptable for use in detecting intermittently open tube elements owing to the fact that the controlling circuit functions as a result of a change of direct current level. That is, the tube 35 may be tested while being tapped or otherwise vibrated for the purpose of thereby bringing out and causing to be detected defects which would be only intermittent and not necessarily result in unsatisfactory operation of the tube under all conditions.

The sensitivity control referred to above and provided by the variable resistance device or rheostat 12 and the cathode resistor 11 is adapted for adjustably varying the voltage of the cathode 8 of the detector tube or thyratron 2 in order thereby to adjust the arrangement for use in testing tubes of different characteristics and to vary the sensitivity of the controlling circuit in detecting tube defects. That is, by adjusting the sensitivity control rheostat 12, the voltage of the thyratron cathode 8 may be made more positive so that its grid voltage is more negative with respect to the cathode. Then, when a good tube having a higher internal resistance than that previously tested is tested, the higher voltage at the detector grid 18 will still not be high enough to permit firing or ignition.

Setting the sensitivity control rheostat 12 such that the thyratron grid voltage is very close to but less than that required to ignite the thyratron, with a tube under test in the socket, will insure firing of the thyratron when the intermittent circuit-open condition and resultant voltage drop is of even an extremely short duration.

It will be seen that my arrangement is adapted for incorporation in automatic testing equipment, and it is for the purpose of bringing out such adaptability that I have provided the relay coil 16. By means of the energization of the relay coil 16, as effected through the detection of an unsatisfactorily operating tube, relay contacts (not shown) may be adapted to control means (not shown) for ejecting defective tubes from the socket 25 into a chute or the like adapted for directing the defective tubes to a receptacle while the good tubes are retained in the socket for further tests or processing in advance of packing for shipment.

While I have shown my arrangement in use testing a diode 35, it is equally adaptable for testing tubes of any plurality of electrodes or elements. That is, the circuit may be easily preset for operation in testing tubes of a greater number of elements than a diode simply by closing the switches 31 associated with the receptacles 24 adapted for receiving the pins connected to the additional elements. In the same manner as in the testing of the diode 35 described above, the voltage drop caused by a good conducting tube and the resultant low voltage placed on the thyratron grid 18 will be ineffective for refiring the thyratron following release of the reset button 15, and an open circuit caused by a defective connection between any one of the tube elements and its respective pin or a broken element will result in a voltage on the grid 18 positive enough relative to the voltage on the cathode 8 for firing the thyratron thereby to detect such defect and effect an indicative energization of the relay coil 16.

It is when multielement tubes or tubes having more elements than a diode are being tested that the use of resistors 22 becomes apparent. Since these resistors are of high value, the current which would normally flow through any defective tube element cannot be shunted by a good element to cause a large voltage drop across the dropping resistor 21 of the bad element. Thus, the detector grid voltage will rise appreciably when any tube element in the tube under test is defective.

In Fig. 2 is illustrated a modified form of my invention which is identical to that shown in Fig. 1 and described above except for the provision of an interrupted unidirectional power source, which obviates the need for a reset button. In order to simplify illustration of this modified form of my invention I have shown in Fig. 2 only that portion thereof that is adapted to replace the part of the circuit of Fig. 1 at the right of the line X—X.

The numerals primed in Fig. 2 designate elements that are identical in structure and operation to those shown in Fig. 1. My modification specifically differs from the arrangement in Fig. 1 in the provision of a pulsating direct-current power source which, by way of example may consist of an arrangement generally designated 39 comprising a transformer having the primary thereof connected across a conventional alternating current source, and a rectifier 40. The rectifier 40 is poled as indicated in Fig. 2; and, as shown, the positive terminal of the rectifier is connected to the junction of line 3' and rheostat 12' and the cathode of the rectifier is connected to one side of the secondary of the transformer. The other side of the secondary is connected by lead 4' to ground 5'. The operation of the modified form of my invention is identical to that described above with regard to Fig. 1. It differs only in that the pulsating voltage supplied to the plate 7' of the thyratron 2' obviates the need for a reset button since the thyratron 2' will be extinguished at every voltage zero of the pulsating wave in preparation for being reignited by the detection of any unsatisfactorily operating tube under test.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. Electronic tube testing means comprising; a grid controlled gas discharge tube having a control grid, a cathode, and an anode, a reset switch and reject indicating means connected in the anode circuit of said gas discharge tube, a source of energizing potential connected in the anode-cathode circuit of said gas discharge tube, a first resistive network connected in circuit relationship with said source of energizing potential and the control grid of said gas discharge tube, a plurality of additional resistive networks having selector switches adapted to selectively connect desired ones of said additional resistive networks in parallel circuit relationship with said first resistive network, a universal tube socket adapted to receive any one of a plurality of electron tube types, a source of heater filament voltage connected to the socket terminals adapted to receive the heater filament pins of a tube under test, a first conductor connecting the terminal of the socket adapted to receive the cathode pin of a tube under test to the cathode circuit of the gas discharge tube, a second conductor connecting the terminal of the socket adapted to receive the anode pin of a tube under test to said first resistive network, and a plurality of additional conductors each one connecting an additional terminal of the universal tube socket to a respective one of said additional resistive networks.

2. The combination set forth in claim 1, wherein said source of energizing potential is pulsating in character.

References Cited in the file of this patent

UNITED STATES PATENTS

| | | |
|---|---|---|
| 2,172,897 | Wenger | Sept. 12, 1939 |
| 2,460,127 | Gardiner et al. | Jan. 25, 1949 |
| 2,699,528 | Periale | Jan. 11, 1955 |
| 2,749,510 | Rively | June 5, 1956 |